Dec. 30, 1969  R. E. BENNETT  3,486,236
INSPECTION TOOL
Filed Jan. 5, 1966  3 Sheets-Sheet 2
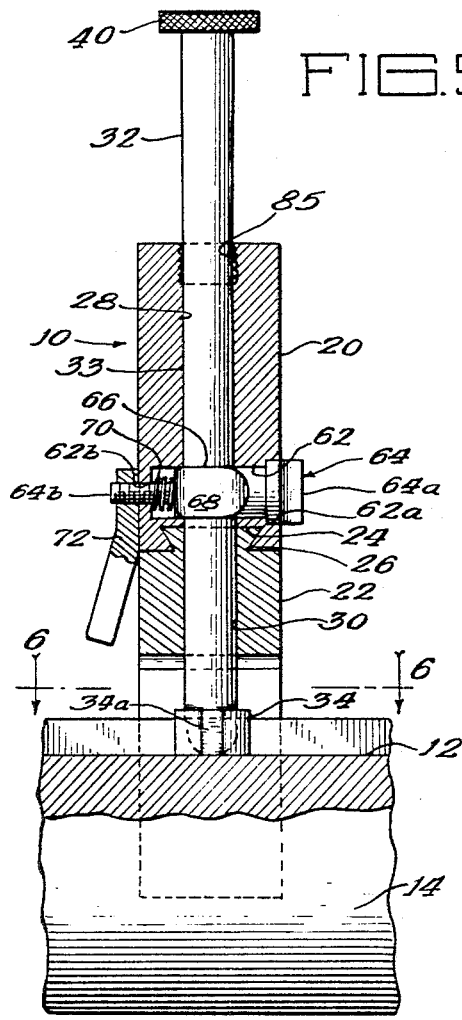
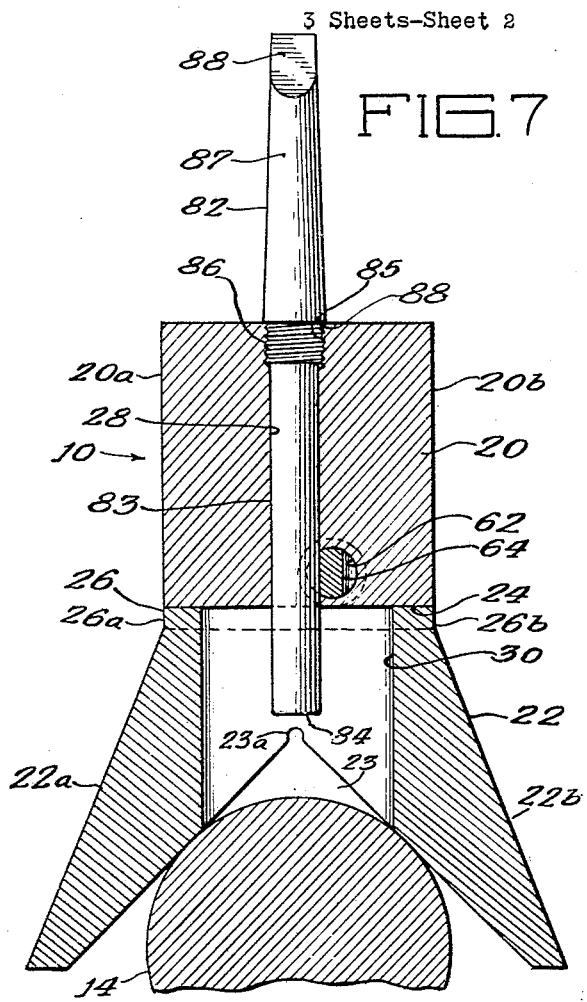
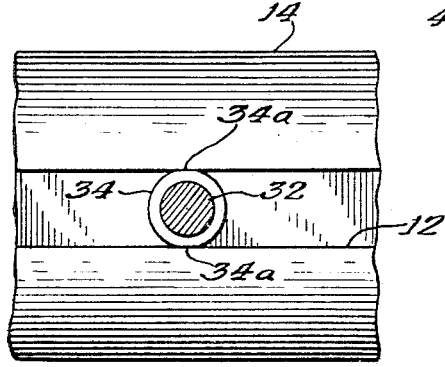
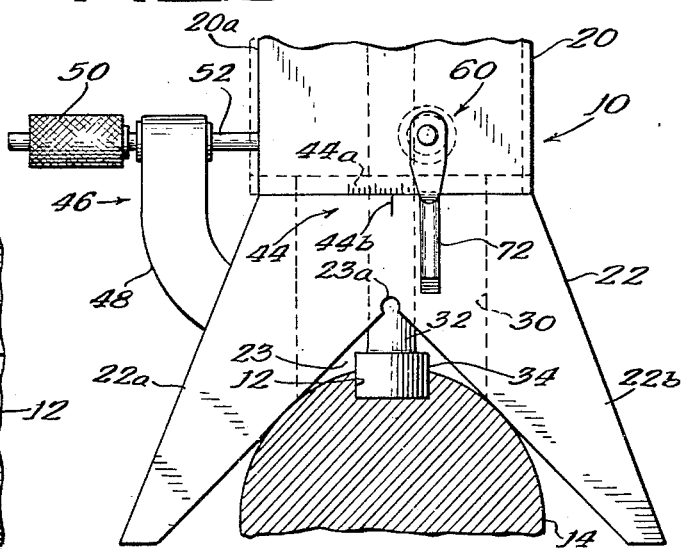

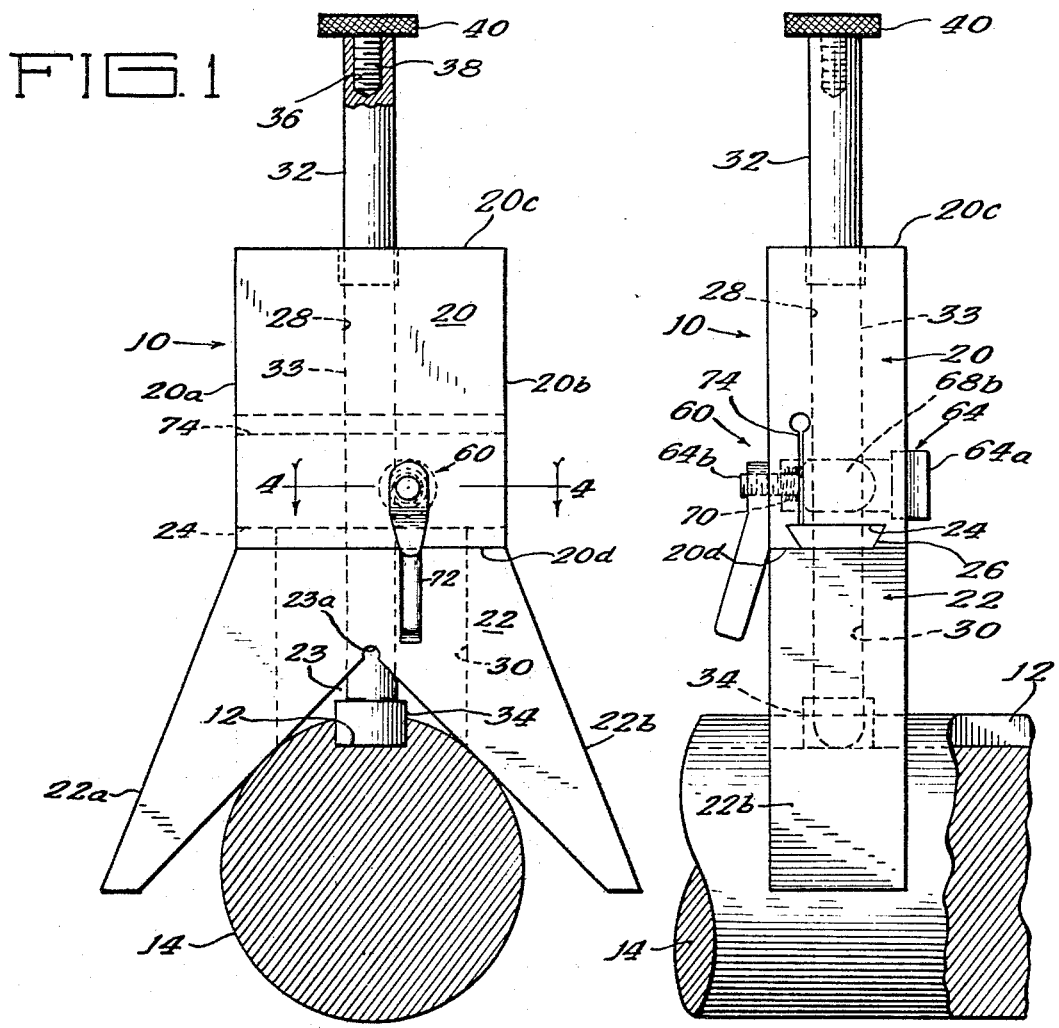
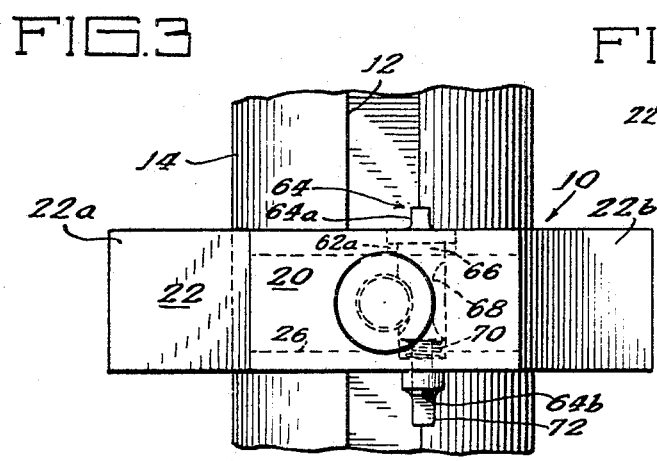
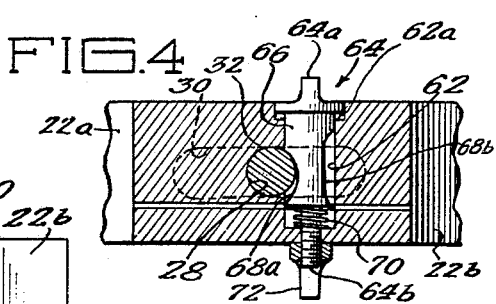

Dec. 30, 1969  R. E. BENNETT  3,486,236
INSPECTION TOOL
Filed Jan. 5, 1966  3 Sheets-Sheet 3
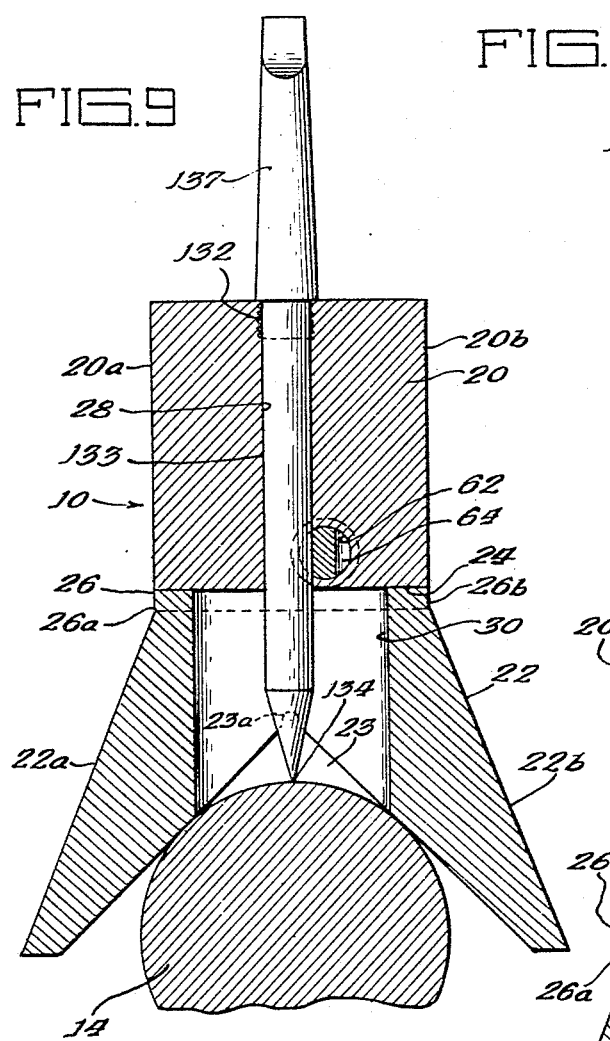
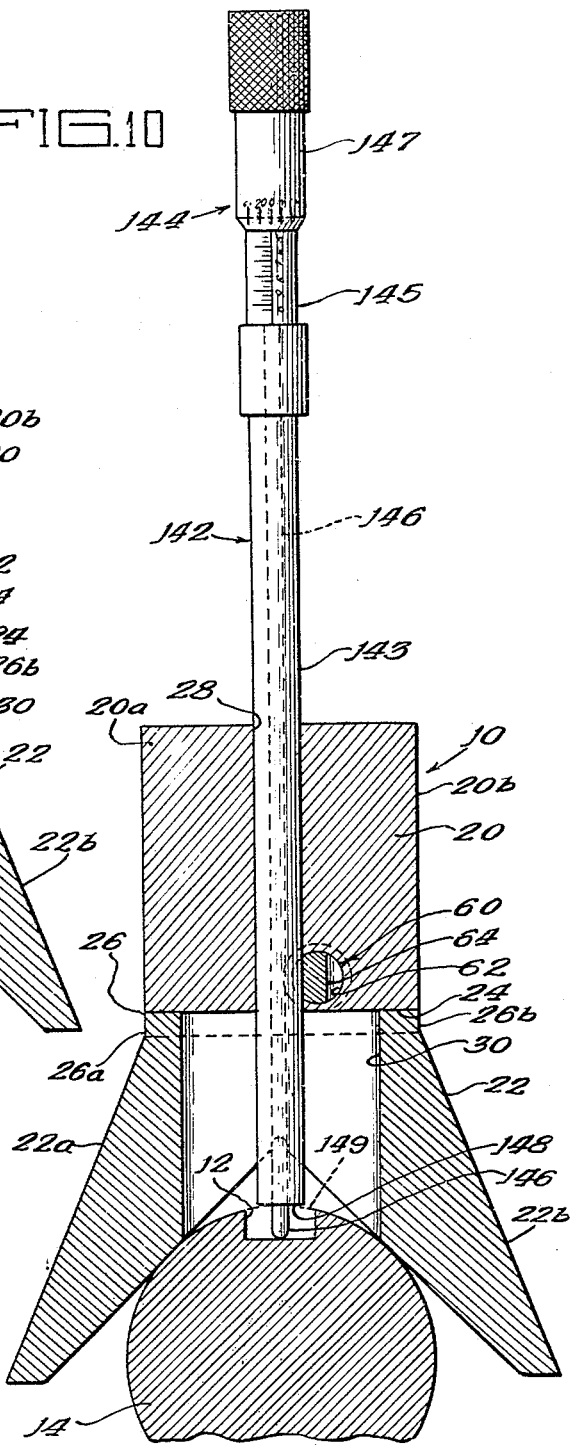

United States Patent Office 3,486,236
Patented Dec. 30, 1969

3,486,236
INSPECTION TOOL
Ralph E. Bennett, 1134 Townsend St.,
Sycamore, Ill. 60178
Filed Jan. 5, 1966, Ser. No. 518,877
Int. Cl. G01b 5/08
U.S. Cl. 33—174                                5 Claims

ABSTRACT OF THE DISCLOSURE

A keyway inspection and setup tool having an inverted V-shaped base, an upper member slidably mounted on the base, a through bore through the legs of the V of the base and in communication with a reduced diameter through bore in the upper member, and a gauge element having a shank of a size to be received in the reduced bore in the upper member and a tip of a size and shape to be matingly received within a keyway with which the tool is intended to be used, with means for locking the upper and lower members against slidable movement relative to each other and means further for locking the gauge element in the bore of the upper member.

This invention relates to inspection tools and more particularly to a measuring and inspecting tool for use with workpieces having a generally cylindrical cross-sectional configuration, such as for inspecting keyways in shafts.

Frequently in the machining art it is desirable to have an instrument for locating a point on the surface of a workpiece which has a generally circular cross-sectional configuration (including truly circular or polygonal) with respect to a diameter of the workpiece or with respect to another point on the surface of the workpiece. It is also desirable to have an instrument which may be capable of accurately measuring an interruption in the surface of the workpiece, such as a slot or "keyway" or the like, both with respect to the dimension of the interruption and its location relative to another point on the workpiece, or relative to a diameter of the workpiece.

Previous inspection and measuring tools for accomplishing these purposes have included cumbersome and relatively complex structures which are somewhat difficult to manipulate and include several component parts thereby adding to the expense of the tool as well as to the possibility of error due to a malfunction of one of the parts. Furthermore, these previously known tools have not attained a desired degree of accuracy in the measurements which they can accomplish and have not been capable of determining, to a desired degree of accuracy, whether a point on the surface of the workpiece is offset relative to a diameter or center line of the workpiece.

It is therefore a primary object of this invention to provide a new and improved measuring and inspecting tool for determining the location of a point on the surface of a workpiece.

It is another object of this invention to provide a new and improved measuring and inspecting tool for accurately measuring the dimension of a surface interruption formed in a workpiece as well as measuring the location of the interruption relative to a center line or diameter of the workpiece.

It is a further object of this invention to provide a new and improved measuring and inspecting tool for determining the location of a point on a workpiece and for measuring the dimension of a surface interruption on a workpiece including a member constructed and arranged to removably receive a gauging element which serves as the index means for locating a desired point on a surface of the workpiece or serves as a measuring and indexing means for measuring the dimension of a surface interruption in a workpiece as well as the location of the surface interruption on the workpiece so that gauging elements of different end configurations may be interchangeably used with the tool to adapt the tool for use in a variety of measuring functions.

It is still another object of this invention to provide, in such a measuring and inspecting tool as described, a means for locking the gauging element in the tool and for locking the tool in a position determined by a measurement made of the location of a point or surface interruption on the surface of a workpiece.

It is still a further object of this invention to provide in such a measuring and inspecting tool as described, a scale on the tool for determining the deviation of one point on the surface of the workpiece from another point or from a diameter or center line of the workpiece.

Other objects, features and advantages of the present invention will be apparent from the following description of the preferred embodiments illustrated in the accompanying drawings, in which:

FIGURE 1 is a front elevational view, partially broken away in section, of the measuring tool of this invention, showing the tool in use in measuring the dimension and location of a keyway relative to the diameter of a shaft by means of the gauging element associated with the tool;

FIGURE 2 is a side elevational view partially broken in section of the tool of this invention in substantially the same position as shown in FIGURE 1.

FIGURE 3 is a top plan view of the tool of this invention in substantially the same position as shown in FIGURE 1;

FIGURE 4 is a fragmentary sectional view taken along the line 4—4 of FIGURE 1 illustrating the locking means of the tool of this invention;

FIGURE 5 is a fragmentary sectional view of the tool of this invention taken in a plane parallel to the side elevational plane as shown in FIGURE 2;

FIGURE 6 is a fragmentary sectional view taken along the line 6—6 of FIGURE 5 showing the relationship of the end of the gauging element and the surface interruption in the workpiece;

FIGURE 7 is a fragmentary sectional view of the measuring tool of this invention taken in a plane generally parallel to the front elevational plane and showing a modified gauging element in use with the tool of this invention;

FIGURE 8 is a fragmentary view, generally in front elevation, of the measuring tool of this invention showing different scale means which may be formed on the tool of this invention to provide a means for determining the amount of deviation of a point on the surface of the workpiece from another point or from the center line or diameter of the workpiece;

FIGURE 9 is a fragmentary sectional view similar to FIGURE 7 showing another modified insert element in use with the tool of this invention; and FIGURE 10 is is a fragmentary sectional view similar of FIGURES 7 and 9 showing still another modified insert element in use with the tool of this invention.

The measuring and inspecting tool 10 of this invention is intended for use in determining the dimension of a surface interruption, such as keyway 12, and/or the location of that interruption or a point on the surface of a workpiece 14 relative to another point or relative to the center line or diameter of the workpiece. In the drawings, the workpiece 14 is illustrated as a shaft having a generally circular cross-sectional configuration. It will be readily appreciated by those skilled in the art that this tool may be used with workpieces other than circular cylindrical shafts. For example, this tool could be used for the same measuring and gauging functions with respect to an octagonal stub or shaft or a polyhedral solid.

Furthermore, by the use of the term "diameter," it is to be understood that this is meant to refer generally to an imaginary line extending between opposite sides of the workpiece and passing through the center or axis thereof. Without intending to limit the scope of this invention or the scope of the intended use of the tool of this invention, the workpiece shown in the drawings and described in the specification will be one having a generally circular cross-sectional configuration.

The tool includes a body of two relatively movable members, such as a first block-like upper body member 20, having opposite sides 20a and 20b and top and bottom 20c and 20d, respectively, and a second bifurcated lower body member 22 having a pair of legs 22a and 22b. Legs 22a and 22b flare outwardly and away with respect to the longitudinal extent of the body forming a generally V-shaped notch 23 between the legs. Preferably, the angle between the legs 22a and 22b is 90 degrees and the tool is symmetrical with respect to a plane which intersects the apex 23a of the angle between the legs.

Upper member 20 and lower member 22 are preferably formed of very hard material, such as tool steel, capable of being accurately machined and of retaining the machined dimensions over a long period of time. The members 20 and 22 are mounted for slidable movement relative to each other. One suitable means for accomplishing this would be through the provision of a female dove-tail groove 24 at the bottom 20d of upper member 20 and a male dove-tail tongue 26 at the upper end of the bottom member 22. The mating tongue and groove extend in a direction which is generally transverse to the longitudinal extent of the tool, as well as generally transverse to the extent of legs 22a and 22b and notch 23. However, the mating groove and tongue 24 and 26, respectively, lie in the plane of the legs 22a and 22b so that the relative movement of the upper and lower body members is in the plane of the body but generally transverse to the legs and notch 23. Hereinafter, this movement will be generally described as "lateral."

The upper body member is provided with a generally centrally located, longitudinally extending bore 28, the axis of which is perpendicular to the direction of relative or lateral movement of the upper and lower body members. Bore 28 extends completely through the upper members 20, opening at the top 20c thereof and at the bottom 20d through the female slot 24. The lower body member is provided with a bore 30, the axis of which is coaxial with respect to bore 28 and intersects vertex 23a. Bore 30 is enlarged relative to bore 28 in the direction of relative lateral movement between the upper and lower members. This bore extends from the male dove-tail top through the notch 23 between the legs 22a and 22b so that the tool, when assembled, is provided with a continuous opening extending from the upper surface of the body or upper member 20 and opening through the lower surface of the body or lower member 22 in the notched area 23 between the legs 22a and 22b. This opening afforded by the coaxial bores 28 and 30 in the upper and lower body members is constructed and arranged to receive a gauging element, insert element, or insert tool 32.

The insert tools or gauge elements 32 are intended to be constructed and arranged with respect to the bores 28 and 30 so as to be movable only axially relative to the bores. One preferred form of accomplishing this end is to form the shank portions 33 of these insert tools of a configuration which closely concentrically mates with the smaller bore 28 so that the shank 33 has a close sliding fit with respect to the bore 28. In this respect, the insert tool or gauge element 32 will be rotatably and axially movable with respect to the openings through the tool 10 but will not be able to cant or move laterally or radially with respect to the openings 28 and 30.

The gauging element 32 has a working end 34 which is intended to extend into the notch 23 between legs 22a and 22b. Depending upon the function desired to be accomplished with this tool 10, the working end 34 may have one of several configurations. FIGURES 1, 2, 5, 6 and 8 of the drawings show the element 32 in use in measuring the dimension and location of a keyway 12. For this purpose, the end 34 should preferably have a bottom and side wall configuration which mates with that of the keyway. Generally this keyway is a square-sided notch and the bottom and sides of end 34 will be formed accordingly. Moreover, the dimension across the width of bottom 34 should be coextensive with the desired width of the keyway to be formed in the workpiece.

For the purposes of measuring and locating keyways, the preferred configuration of working end 34 has been found to be one which is generally circular in right section and one wherein the bottom is a right section relative to the circular walls of end 34. If desired, the working end 34 may be provided with diametrically spaced flat portions 34a, the dimension across which exactly corresponds to the desired "minus" tolerance of the keyway 12.

At least a portion of the remainder of the periphery of the working end 34 may be formed to a dimension which exactly corresponds to the "plus" tolerance of the keyway 12. In this way, it may be readily determined if the keyway is formed outside the allowable tolerances. Furthermore, assuming the keyway is within the tolerances, a snug fit of the working end 34 in keyway 12 may be easily accomplished by rotating the gauging element so that the working end will frictionally engage the side walls of the keyway at some point between the flats 34a and the remainder of the slightly enlarged periphery.

The upper end of the insert element 32 may be provided with a threaded hole 36 for receiving the threaded shank 38 of a knurled knob 40. In this way, insert element 32 may be impaled relative to tool 10 by inserting the non-working end of the shank into the bores 30 and 28. The knob 40 may then be assembled on the tool to provide a surface for manipulating the insert element 32. It is to be understood that instead of this arrangement, the knob 40 could be fixed on the shank and different working ends 34 could be threadably associated with the opposite end of the shank.

In operation, when the tool 10 is being used to check the dimension and location of a keyway, the insert tool 32 is inserted through the bores 30 and 28 in the body of the measuring tool. Knurled knob 40 may then be threaded on the upper end of the tool. The working end 34 is located in the keyway 12, an insert tool 32 having been previously selected with a working end 34 of a dimension which corresponds to the intended dimension of the keyway. If the keyway has been properly machined to the proper width, the working end 34 will precisely fit, in almost a force fit arrangement in the keyway.

With the tool arranged relative to the workpiece as shown in FIGURES 1 through 3 and 5, it may be determined whether or not the keyway 12 is formed so as to be centered exactly on a diameter of the workpiece and, therefore, on the center line or axis of the workpiece. With the insert tool 32 snugly received in keyway 12, the longitudinal center line of the keyway will lie in the same plane as the axis of the insert tool 32. Because the axis of openings 28 and 30 bisects the apex 23a of the angle between the legs 22a and 22b, and the legs are symmetrical about this axis, when the legs straddle a workpiece as shown in the drawings, such as FIGURE 1, an extension of the diameter, or a plane passing through the axis of the workpiece, will also bisect the angle between legs 22a and 22b. If a point or surface interruption such as the keyway 12 is misaligned relative to such a diameter or plane passing through the axis or center line of the workpiece, it will be necessary to laterally displace element 32 relative to the apex 23a of notch 23. Since the shank 33 of element 32 is fixed relative to upper body member for only axial movement, upper body member will also have to be laterally displaced. The lateral enlargement of the opening 30 in lower body member serves to accommodate this displacement afforded by the slidable connection of the upper and lower members.

To facilitate in observing if any of the lateral deviation of the upper member with respect to the lower member has occurred, it is preferable that the distance across the male dove-tail tongue 26 of lower member 22 be coextensive with the lateral dimension of upper member 20, both with respect to the axis or center line of openings 28 and 30 as well as the overall width. In this manner, if no lateral deviation of the two members is necessary, then the side walls 20a and 20b of upper member 20 will be precisely aligned with the side faces 26a and 26b of the male dovetail tongue. If any lateral deviation does occur due to the off-center relation of the surface interruption 12, this will be readily observed in that one side face, either 26a or 26b, will project outwardly with respect to a corresponding side wall 20a or 20b, and the other will be accordingly recessed relative to its corresponding side wall.

In the fragmentary view shown in FIGURE 8, two forms of a measuring or scale means are illustrated. One form of measuring means would be a vernier scale 44 including a series of spaced calibrations 44a formed on the lower end of top member 20 and an index line 44b formed on the upper end of lower member 22. These indicia would be so arranged so that when the axes of the openings 28 and 30 were coaxial, line 44b on the lower member would align with the center or a zero position on the scale 44a. Any lateral deviation of the upper and lower members relative to each other could be read by reading the scale 44a relative to the index mark 44b.

Also, the tool might be provided with a micrometer-like measuring means 46. This could take the form of a leg 48 secured to one of the legs such as 22a for supporting components of the micrometer structure.

A suitable micrometer-like structure shown generally at 50 having shank 52 could be provided so that rotation of the micrometer head would move the shank relative to one side 20a of the upper member 20. Once the tool is set up for use, the micrometer head would be turned so that shank 52 abuts the side 20a of upper member 20. If the keyway has been formed off-center, the upper member 20 will be displaced relative to the lower member as shown in dotted outline in FIGURE 8. Any such deviation may be read on a suitable scale similar to that normally associated with micrometer-like measuring means.

It is to be understood that other measuring or scale means could be formed, such as a corresponding rack and pinion on the relative members (which could be associated with a dial indicator), or a standard micrometer could be used. In such an instance, one surface of the micrometer would be placed against one face, such as 26a, of the male dove-tail member 26, and the other surface against a side wall such as 20b of the upper member, generally in the same plane. The deviation of the distance across the surfaces from the known measured distance could register any lateral deviation of the upper and lower members with respect to each other to indicate that a surface point or interruption on the workpiece was not formed on a diameter or center line of the workpiece.

The tool of this invention is further provided with a locking means, generally designated 60, for locking the gauging element 32 against axial movement relative to the tool, and for locking the upper and lower members against movement relative to each other. To this end, body portion 20 is provided with an opening 62 which extends across the front to rear of the body, the axis of opening 62 extending in a direction which is generally perpendicular to the extent of the axis of bore 28. Opening 62 also partially intersects the bore 28. The opening has one enlarged end 62a which opens in one face of upper member 20 and one reduced end 62b which opens in the opposite face of upper member 20. A bolt 64 is positioned in opening 62, having an enlarged end 64a which nests in the enlarged end 62a of the opening and a reduced threaded end 64b which projects outwardly through the reduced opening 62b. The shank portion 66 of the bolt has generally arcuate cut-away portions 68a and 68b, one of which, such as 68b, may be larger than the other, so that the bolt may be positioned in the opening, which intersects the bore 28, and the shank 33 of a gauging element 32 may also be positioned in bore 28. This is best illustrated in FIGURE 4.

A spring 70 is positioned between the end of the shank portion 66 of the bolt and the reduced portions 62b of the opening. Enlarged end 64a may be provided with a small finger-grip extension to facilitate twisting of the bolt relative to the opening 62. Preferably the opposite end is provided with a handle-like nut 72 which is threaded on the threaded end 64b of the bolt.

Preferably, the enlarged end 62a has a depth which is greater than the axial distance necessary to move bolt 64 so that the cut-away 68a engages the periphery of shank 33. In this manner, the side of cut-away 68a may facially engage shank 33 before enlarged end 64a "bottoms" in enlarged opening 62a. As the nut 72 is threaded relative to threaded end 64b, the shank 66 and the bolt will move axially in the opening. The shank will move to a point wherein the arcuate cut-away 68a firmly facially engages the side of the shank 33 of gauging element 32, the facial frictional engagement between the two, serving to hold the gauging element 32 against axial withdrawal from the bore 28.

To further provide a means for locking the upper member 20 and lower member 22 against movement relative to each other, a slit 74 may be cut across the width of the upper member. In this fashion, as the handle-like nut 72 is further tightened on the bolt 64, it will cause the lower ends of the female dove-tail groove to draw towards each other and frictionally impinge on the male dove-tail tongue 26 of bottom member 22. The nut can be tightened to such an extent that the tight frictional engagement of the female dove-tail groove faces on the male dove-tail tongue member will prevent any relative sliding movement between the upper and lower members.

If it is desired to lock the upper and lower members 20 and 22, respectively, without locking gauging element 32, this may be accomplished by turning bolt 64 so that enlarged cut-away 68b is adjacent shank 33. When so positioned, the aforedescribed tightening of nut 72 relative to bolt 64 will lock members 20 and 22 and cause enlarged head 64a to "bottom" in enlarged opening 62a, prior to facial engagement between the sides of enlarged cut-away 68b and shank 33.

It may also be desirable to form a surface interruption, such as a keyway, a certain distance off center relative to the diameter of the workpiece. In such a case, this could be checked by moving the upper and lower members to a laterally displaced position which is coextensive with the desired amount of deviation of the surface interruption relative to the diameter. With the tool subsequently locked in such a position, it may be used to insure that all such keyways are formed in such an offset position.

A modified insert tool 82 is shown in FIGURE 7. Insert tool 82 also preferably has a shank 83 which closely concentrically mates with the bore 28. The end 84 of modified tool 82 need not have any particular configuration and preferably is merely a section across the shank 83. In addition, the tool may be provided with a slightly enlarged tapered shank portion 87 which terminates in a radially projecting shoulder 88. It is intended that the distance beween the shoulder 88 and end 84 would be such as to maintain end 84 spaced from the periphery of the workpiece 14.

The tapered shank may be provided with a taper commonly known as a "Morris Taper" wherein the shank is also provided with flat portions 89 so as to adapt the shank for reception in a machine tool, such as a common drill press. With such an insert element 82, the tool 10 could be used to center the machine tool relative to the workpiece 14, after the insert element 82 is locked by means 60.

Another means for locking an insert element in tool 10 is shown in FIGURE 7 wherein bore 28 is formed with a threaded interior portion 85 so that it can accommodate a threaded exterior portion 86 on the shank of an insert element. This also will serve to fix the insert element relative to the upper member 20 of tool 10.

With the element 82 threaded in the tool and the tapered end in the machine tool such as a drill press, the press could be centered relative to workpiece 14 when the tool straddles the workpiece as shown in FIGURE 7 by means of the relative lateral movement permissible between the upper and lower members 20 and 22, respectively.

A further modified insert element 132 is shown in FIGURE 9. Again, the element has a shank portion 133 which is generally coextensive in cross-sectional dimension with the bore 28. The working end 134 is formed in a hardened pointed configuration. As was the case with insert element 82, a modified tapered shank portion 137 is provided which may terminate in a laterally enlarged shoulder 138. This insert element 132 may be used for making a centering mark on the surface of workpiece 14. If the insert element 132 is provided with a tapered end as shown, tool 10 may be placed in a straddling position about workpiece 14 as shown in FIGURE 4, and insert element 132 locked by locking means 60. Then a rather abrupt, hard force may be applied to insert element 132 to cause a centering mark to be made on the surface of workpiece 14. It is possible, of course, that the tool 132 could be formed with an ordinary shank portion in which case it could simply be used as a manual marking tool.

A further modified insert element 142 is shown in FIGURE 10. Insert element 142 again is provided with a shank 143 generally coextensive in cross-sectional dimension with that of the bore 28. A micrometer head 144 is formed on the upper end of the shank 143 and has the usual micrometer-like scale 145 formed thereon. A micrometer shaft 146 is positioned within the interior of shank 143 and connected to the rotatable portion 147 of head 144. Rotation of portion 147 will cause axial movement of shaft 146 relative to shank 143 and corresponding reading of the relative movement of shaft 146 may be obtained from scale 145 in a well-known micrometer fashion.

The end 148 of shank 143 is preferably a rather blunt, flat end. To measure the depth of a keyway, shaft 146 is first retracted within its sleeve-like shank 143 and the tool is positioned on a portion of the periphery of workpiece 14 spaced away from keyway 12. Insert element 142 is then placed so that end 148 abuts the periphery of workpiece 14 as indicated by the dotted line continuation of the periphery 149a in FIGURE 10 and the insert element is locked in this position by locking means 60. Tool 10 is then moved so that it straddle the keyway 12, and portion 147 is rotated until shaft 146 abuts the bottom of keyway 12. The depth of the keyway may then be obtained from reading scale 145.

It will be appreciated by those skilled in the art that this tool has a variety of uses other than those mentioned. For example, the gauging element used with the tool may be formed so as to check the dimensions of surface interruptions of different shapes such as generally circular, generally rectangular, or the like. Moreover, appropriate indicia may be formed on the insert element to measure the depth of the surface interruption.

The measuring and inspecting tool of this invention is formed of relatively simple structure which may be easily handled and manipulated. The structure is relatively economical to produce and virtually maintenance free in operation. In addition, the structure inherently provides for extreme accuracy in measuring and will be virtually unaffected by wear of the component parts.

The foregoing detailed description has been given for clearness of understanding only, and no unnecessary limitations should be understood therefrom, as some modifications may be obvious to those skilled in the art.

I claim:
1. A keyway inspection and setup tool comprising a base having a top surface and an opposite inverted V-shaped lower end with outwardly diverging legs and an enlarged through bore in the base and opening through the diverging legs; an upper member having a top and a lower end freely, slidably connected to the top of the base for to and fro movement of the upper member in the direction of the outwardly extending legs, with a through bore in the upper member for communication with the base bore, said upper member bore including means for restricting the size thereof relative to the base bore; and a gauging member having a shank of a size to be snugly received by the restricting means of the upper member bore and a tip of a size and shape to generally matingly occupy the width of a keyway with which the tool is intended to be used, the tip having a peripheral configuration of opposed lateral portions of different diameters all of which are centered on the axis of the gauging member shank, said diameters ranging in dimensional value from a smallest diameter being equivalent to the minimal tolerable keyway width for the keyway with which the gauging member is to be used, to a largest diameter being equivalent to the maximum tolerable keyway width for the keyway with which the gauging member is to be used, with the remaining diametral portions lying between said smallest and largest diameters.

2. The tool of claim 1 wherein the gauging member tip has a pair of opposed parallel flat sides, with the smallest diameter extending between the parallel sides, and wherein the nonparallel sides are generally arcuate and extend between said parallel sides with the largest diameter extending between the arcuate non-parallel sides.

3. The tool of claim 1 wherein the upper member has a slot in the lower end and the base member has a rail in the top nestably received in the upper member slot, the slot in the upper member extending between spaced sides thereof with the rail in the base member being generally coextensive in length with the distance between said spaced sides of the top.

4. A keyway inspection and setup tool comprising: a base having a top surface including an upwardly projecting protruding rail and an opposite inverted V-shaped lower end with legs diverging outwardly in the direction of the rail, and an enlarged through bore in the base and opening through the top and the diverging legs; an upper member having a top and a channeled lower end closely slidably embracing the rail of the top of the base for to and fro movement of the upper member in the direction of the outwardly extending legs, with a through bore in the upper member for communication with the base bore, the upper member further including a slit which extends in the direction of the channel and rail of the upper and base members; a gauging member having a shank of a size to be received in the base and upper member bores and a tip of a size and shape to generally matingly occupy the width of the keyway with which the tool is intended to be used; and a cross bore formed in the upper member generally transverse to, and intersecting with, the upper member through bore and the upper member slit; a locking bolt generally occupying the cross bore and having a recess therein mating with a portion of the interior of the upper member through bore to permit the shank of the gauging element to occupy the upper member through bore, the bolt being mounted for movement across the through bore for engagement with the shank of the gauging element and including a head in engagement with a portion of the top member on one side of the slit, and a nut member in engagement with a portion of the top member on the other side of the slit, whereby tightening of the bolt causes the bolt to move across the through bore and engage the shank of the gauging element to hold the same therein and further tightening causes compression of the slit and locks the channel portion of the top of the rail portion to the base.

5. The tool of claim 4 wherein the bolt has a second recess opposite the first recess, the second recess being enlarged relative to the first recess.

References Cited

UNITED STATES PATENTS

| | | |
|---|---|---|
| 1,159,025 | 11/1915 | Hess. |
| 2,679,692 | 6/1954 | Fortner et al. |
| 1,020,020 | 3/1912 | Brawley. |
| 3,370,310 | 3/1921 | Gustavson _____ 33—167 |
| 2,548,010 | 4/1951 | Frisz. |
| 2,572,999 | 10/1951 | Elliott. |
| 3,128,559 | 4/1964 | Winter _____ 33—170 |

FOREIGN PATENTS

| | | |
|---|---|---|
| 112,300 | 10/1964 | Czechoslovakia. |
| 643,806 | 5/1928 | France. |
| 930,335 | 8/1947 | France. |
| 374,107 | 4/1923 | Germany. |
| 474,098 | 3/1929 | Germany. |
| 298,172 | 7/1954 | Switzerland. |

OTHER REFERENCES

German printed application G 15,547 IX/426, November 1955.

ROBERT B. HULL, Primary Examiner

U.S. Cl. X.R.

33—169, 170, 180